United States Patent [19]

Lisle et al.

[11] Patent Number: 5,969,720
[45] Date of Patent: Oct. 19, 1999

[54] DATA PROCESSING SYSTEM AND METHOD FOR IMPLEMENTING AN INFORMATIVE CONTAINER FOR A FILE SYSTEM

[75] Inventors: Linda Arnold Lisle, Cedar Park; Shirley L. Martin; John Martin Mullaly, both of Austin, all of Tex.

[73] Assignee: International Business Machines Corporation, Armonk, N.Y.

[21] Appl. No.: 08/813,718

[22] Filed: Mar. 7, 1997

[51] Int. Cl.⁶ .................................................... G06F 3/14
[52] U.S. Cl. ......................... 345/351; 345/352; 345/353
[58] Field of Search .................................. 345/349, 351, 345/352, 353, 356, 357

[56] References Cited

U.S. PATENT DOCUMENTS

| | | | |
|---|---|---|---|
| 4,601,003 | 7/1986 | Yoneyama et al. | 345/351 |
| 4,899,136 | 2/1990 | Beard et al. | 340/706 |
| 4,939,507 | 7/1990 | Beard et al. | 340/706 |
| 5,060,135 | 10/1991 | Levine et al. | 364/200 |
| 5,079,723 | 1/1992 | Herceg et al. | 345/352 |
| 5,113,517 | 5/1992 | Beard et al. | 364/200 |
| 5,261,044 | 11/1993 | Dev et al. | 395/159 |
| 5,276,785 | 1/1994 | Mackinlay et al. | 395/127 |
| 5,305,435 | 4/1994 | Bronson | 345/351 |
| 5,347,628 | 9/1994 | Brewer et al. | 345/351 |
| 5,349,658 | 9/1994 | O'Rourke et al. | 345/349 |
| 5,479,603 | 12/1995 | Stone et al. | 395/161 |
| 5,491,781 | 2/1996 | Gasperina | 395/157 |
| 5,524,199 | 6/1996 | Orten et al. | 395/157 |
| 5,544,302 | 8/1996 | Nguyen | 395/161 |
| 5,751,287 | 5/1998 | Hahn et al. | 345/351 |

OTHER PUBLICATIONS

Burge, Thomas E., et al. "PM's Window Hierarchy," *Advanced OS/2™ Presentation Manager Programming*, John Wiley & Sons, Inc., New York, NY, pp. 37–38.

*Microsoft® OS/2 Programmer's Reference*, vol. 1, Microsoft Press, 1989, pp. 64, 71, 112, 119, 120.

Muller, Nathan, "Dial 1–800–Internet," *Byte*, Feb., 1996, pp. 83–88.

*Object–Oriented Interface Design: IBM Common User Access™ Guidelines*, Que Corporation, 1st Ed. (Dec. 1992), pp. 43–45, 55–57, 235, 329, 342, 497 and 654.

Wayner, Peter, "Hey Baby, Call Me at My IP Address," *Byte*, Apr., 1996, pp. 142–144.

*The Windows™ Interface: An Application Design Guide*, Microsoft Press, 1992, pp. 126–127.

U.S. application No. 08/753,081, entitled "Creating Real–World Objects" (Attorney Docket No. AT9–96–204).

U.S. application No. 08/753,082, entitled "Data Processing System and Method for Contolling a View of a Realistic Object in a Display Device" (Attorney Docket No. AT9–96–212).

(List continued on next page.)

*Primary Examiner*—Raymond J. Bayerl
*Assistant Examiner*—Cuong T. Thai
*Attorney, Agent, or Firm*—Barry S. Newberger; Winstead, Sechrest & Minick P.C.; Volel Emile

[57] ABSTRACT

A data processing system renders a real-world object on a display device to represent a storage space of the data processing system. The real-world object is displayed with various labels and indicators to provide information about the internal contents of the storage space represented by the object as well as the storage space itself. Such visual indicators allow an external user to access information about the contents of a storage space without actually opening the storage space or delving into the depths of the user interface to determine additional information. In addition to providing information about the storage space represented by the real-world metaphor, the data processing system also allows the external user to selectively name the storage space represented by the object in a useful manner.

29 Claims, 8 Drawing Sheets

OTHER PUBLICATIONS

U.S. application No. 08/753,077, entitled "Prioritization of Background Display During Animation" (Attorney Docket No. AT9–96–213).

U.S. application No. 08/753,122, entitled "Multifunctional Object" (Attorney Docket No. AT9–96–214).

U.S. application No. 08/753,076, entitled "System and Method for Maintaining Size and Position Relationships for Non–Rectangular Real–World Objects" (Attorney Docket No. AT9–96–237).

U.S. application No. 08/753,124, entitled "Data Processing System and Method for Scaling a Realistic Object on a User Interface" (Attorney Docket No. AT9–96–240).

U.S. application No. 08/753,078, entitled "Data Processing System and Method for Viewing Objects on a User Interface" (Attorney Docket No. AT9–96–241).

U.S. application No. 08/753,079, entitled "Data Processing System and Method for Performing Automatic Actions in a Graphical User Interface" (Attorney Docket No. AT9–96–242).

U.S. application No. 08/753,123, entitled "Data Processing System and Method for Modifying a Size of a Realistic Object on a User Interface" (Attorney Docket No. AT9–96–246).

FIG. 3B

DATA PROCESSING SYSTEM AND METHOD FOR IMPLEMENTING AN INFORMATIVE CONTAINER FOR A FILE SYSTEM

CROSS-REFERENCE TO RELATED APPLICATIONS

The present application is related to the following applications:

Ser. No. 08/753,081, entitled "CREATING REAL-WORLD OBJECTS" (Attorney Docket No. AT9-96-204);

Ser. No. 08/53,082, entitled "DATA PROCESSING SYSTEM AND METHOD FOR CONTROLLING A VIEW OF A REALISTIC OBJECT IN A DISPLAY DEVICE" (Attorney Docket No. AT9-96-212);

Ser. No. 08/753,077, entitled "PRIORITIZATION OF BACKGROUND DISPLAY DURING ANIMATION" (Attorney Docket No. AT9-96-213);

Ser. No. 08/753,122, entitled "MULTIFUNCTIONAL OBJECT" (Attorney Docket No. AT9-96-214);

Ser. No. 08/753,076, entitled "SYSTEM AND METHOD FOR MAINTAINING SIZE AND POSITION RELATIONSHIPS FOR NON-RECTANGULAR REAL-WORLD OBJECTS" (Attorney Docket No. AT9-96-237);

Ser. No. 08/753,124, entitled "DATA PROCESSING SYSTEM AND METHOD FOR SCALING A REALISTIC OBJECT ON A USER INTERFACE" (Attorney Docket No. AT9-96-240);

Ser. No. 08/753,078, entitled "DATA PROCESSING SYSTEM AND METHOD FOR VIEWING OBJECTS ON A USER INTERFACE" (Attorney Docket No. AT9-96-241);

Ser. No. 08/753,079, entitled "DATA PROCESSING SYSTEM AND METHOD FOR PERFORMING AUTOMATIC ACTIONS IN A GRAPHICAL USER INTERFACE" (Attorney Docket No. AT9-96-242);

Ser. No. 08/753,123, entitled "DATA PROCESSING SYSTEM AND METHOD FOR MODIFYING A SIZE OF A REALISTIC OBJECT ON A USER INTERFACE" (Attorney Docket No. AT9-96-246); and Ser. No. 08/789,030, entitled "DATA PROCESSING SYSTEM AND METHOD FOR SIMULATING COMPOUND OBJECTS" (Attorney Docket No. AT9-96-278).

All of the above applications were filed on Nov. 20, 1996, except for the latter (Attorney Docket No. AT9-96-278), which was filed on Jan. 27, 1997, and all are assigned to the assignee of the present patent application.

The present patent application is also related to the following applications:

Ser. No. 08/813,717, entitled "A DATA PROCESSING SYSTEM HAVING A LOGICAL CONTAINMENT SYSTEM AND METHOD THEREFOR" (Attorney Docket No. AT9-97-025); and Ser. No. 08/813,754, entitled "A DATA PROCESSING SYSTEM AND METHOD FOR PERFORMING CONTAINER LEVEL ACTIONS" (Attorney Docket No. AT9-97-026), wherein the above patent applications are filed concurrently herewith.

TECHNICAL FIELD

The present invention relates in general to a graphical user interface, and in particular, to a graphical user interface which provides a container for a storage space in a data processing system.

BACKGROUND INFORMATION

As computers have developed to provide greater capabilities at greater speeds, the techniques for interacting with computers have also become much simpler. For example, icons provide pictorial representations of functions which may be executed by a computer and which allow a user to easily access a function with a simple click of a mouse or a stroke of a keyboard key. Icons, while providing an understandable interface, still require the user to perform a step of opening a window before additional information may be gained or functions may be performed. Furthermore, while icons provide pictorial representations of an application or even a memory sub-system, such as a disk drive, an icon is not able to provide additional information about an object with which it corresponds. To access such information, an external user must open a window corresponding to the icon and pull down a menu which allows for an eventual disclosure of the information, or type "dir" to determine information about the application or object referred to by the icon.

In addition to icons, many current software programs use realistic representations of objects to take advantage of a user's experience with the physical world. Therefore, rather than present the user with a series of panels and window frames or pull-down menus, a software program for implementing an application may present a realistically-rendered object which is placed directly on a desktop or other environment. While such realistic representations enable a user to more easily interface with the computer, the applications which implement the realistically-rendered objects are limited by the protocols required by a development system in which the object is implemented.

These limitations are especially apparent in filing systems in an operating system. Most filing protocols implemented in data processing systems require a number of steps to be executed before a certain file or information concerning a file may be accessed. Stated another way, when an object is filed in a storage space of a data processing system, the storage space must often be opened and the user must delve several levels into the interface before the object may be accessed. Users must also perform multiple steps to access information about the stored objects. An example of this is illustrated by the steps the user must perform before a user is able to determine how much disk space is currently available. In today's implementations, a user is forced to either select a "drive space manager" which is several levels deep in the interface or access a command line, type "dir", and wait for the contents of a directory to scroll by on a display device before being able to determine how much disk space is left within that directory. Each of the steps required to obtain access to a storage space or information about a storage space is time intensive and requires an external user to execute an undue number of steps before receiving a desired outcome.

Additionally, current data processing implementations may implement a "status line" mechanism to allow an external user to access information regarding memory in the data processing system. Examples of such implementations are "File Manager" in Windows by Microsoft and "Windows Explorer" by Microsoft. However, like the information accessing mechanisms previously discussed, use of the status line requires several steps and may only be accessed after delving several layers deep in the graphical user interface in which it is implemented. As previously described, this requirement is often time intensive and requires a significant number of steps for a user to perform.

Therefore, a need exists for a filing system in a data processing system which does not require a user to traverse several levels of an interface before they receive the information they desire. Rather, a filing system which is more closely analogous to a real-world object which allows for immediate access of information should be provided.

SUMMARY OF THE INVENTION

The previously mentioned needs are fulfilled with the present invention. Accordingly, there is provided, in a first form, a data processing system. The data processing system includes a display device for displaying a first object which includes a first information label. The first object represents a selected portion of the data processing system. The data processing system also includes a user interface for receiving a first plurality of control signals corresponding to a first data processing operation. The first data processing operation modifies a first characteristic of the selected portion of the data processing system. A central processing unit is connected to the user interface to receive the first plurality of control signals. The central processing unit executes a data processing operation and selectively provides a second plurality of control signals to modify the first information label in response to the first data processing operation.

Additionally, there is provided, in a second form, a method for displaying a container in a data processing system. This method includes the steps of accessing a first information value from a memory of the data processing system to indicate a first displayed characteristic. Next, the method accesses a selected portion of the data processing system corresponding to the container to obtain a second information value corresponding to the first displayed characteristic. The second information value is displayed in a first information label of the container on a display device of the data processing system.

There is provided, in a third form, a program storage device readable by a machine, tangibly embodying a program of instructions executable by the machine to perform method steps for simulating objects in a data processing system. The method steps include the steps of accessing a first information value from a memory of the data processing system to indicate a first displayed characteristic, accessing a selected portion of the data processing system corresponding to the container to obtain a second information value corresponding to the first displayed characteristic, and displaying the second information value in a first information label of the container on a display device of the data processing system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3-A illustrates, in flow diagram form, a methodology for displaying an object in a display device in accordance with one embodiment of the present invention;

FIG. 3-B illustrates, in flow diagram form, a second portion of the methodology of FIG. 3-A;

DETAILED DESCRIPTION

The present invention provides a data processing system, software program, and method for operating each, which extends a notion of a current implementation of disk drives, directories, files, data bases, servers, and partitions in a data processing system into a real-world metaphor that external users will find easily accessible and intuitive to use. As a real-world metaphor, the implementations of the present invention provide a completely usable program on a display device of the data processing system without traditional window adornments such as title bars and window borders. Stated another way, the present invention implements a functional object, not merely an icon.

In the present invention, a filing system for organizing data within a data processing system is implemented as such a real-world metaphor. Additionally, the filing system of the present invention provides capabilities which are not available in real-world filing systems. Therefore, the present invention effectively provides the best of both the real-world and the virtual world of computer systems. Operation of the filing system of the present invention will generally be described below and a more detailed description will subsequently follow.

In the filing system of the present invention, a display device renders an object which represents a filing system of a data processing system on a display device. The displayed object may be a filing cabinet or any other device which may be used for storage. Assume in the following text that the displayed object is a filing cabinet. It should be noted, however, that additional configurations may be developed by a designer of the graphical user interface. In representing the filing system of the data processing system, the filing cabinet is displayed with various labels and indicators to provide information about the internal contents of the storage space represented by each of the drawers of the filing cabinet and the storage space itself. Such a visual indicator would be provided to allow a user to access information about the contents of a storage space without actually delving into the depths of the user interface. For example, such information may be accessed to determine an amount of storage space which remains. Another example of the information that a user may obtain from the filing cabinet object of the present invention includes a listing of the types of objects which are stored within the storage space, such as documents or spreadsheet applications. Other examples of information include a date range of the contents therein and a percentage of storage space occupied by certain types of applications. By providing such information on the face of the filing cabinet object, the design of the present invention allows a user to access information about the storage space represented by the object without executing an undue number of steps, sacrificing efficiency, and losing a real-world context.

As alluded to above, the present invention provides a user interface mechanism which represents a computer storage space as a real-world metaphor and provides information about the computer storage space and the contents therein. In addition to providing information about the storage space represented by the real-world metaphor, the present invention allows a user to selectively name storage space subsets within a data processing system in a useful way. Furthermore, the present invention allows a user to establish criteria for information to be presented on a face of the real-world metaphor and then automatically updates such information when the storage space is accessed. As well, the present invention allows name modification steps to be executed by a user performing an "in place" modification by simply typing in a new name on the keyboard when a cursor is in place over a label or by modifying a label representation in a notebook menu provided by a "Properties" or another similar selection on a menu accessed through the simple click of a mouse or stroke of a return key while the cursor is positioned over the real-world metaphor of the storage space. The performance of "in place" modifications and the use of menus have previously been implemented in data processing systems; however, the present invention integrates such functions well.

As described above, the present invention provides many advantages by implementing a real-world object with additional functionality not available in its real-world counterpart. For example, the present invention allows users to easily modify a label of the storage space about which a user desires to obtain information. Additionally, the present invention allows the user the flexibility of performing actions using a storage space without actually having to perform the time intensive steps of selecting a drive space manager which is several levels deep in the graphical user interface or accessing a command line and typing the command "dir." The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
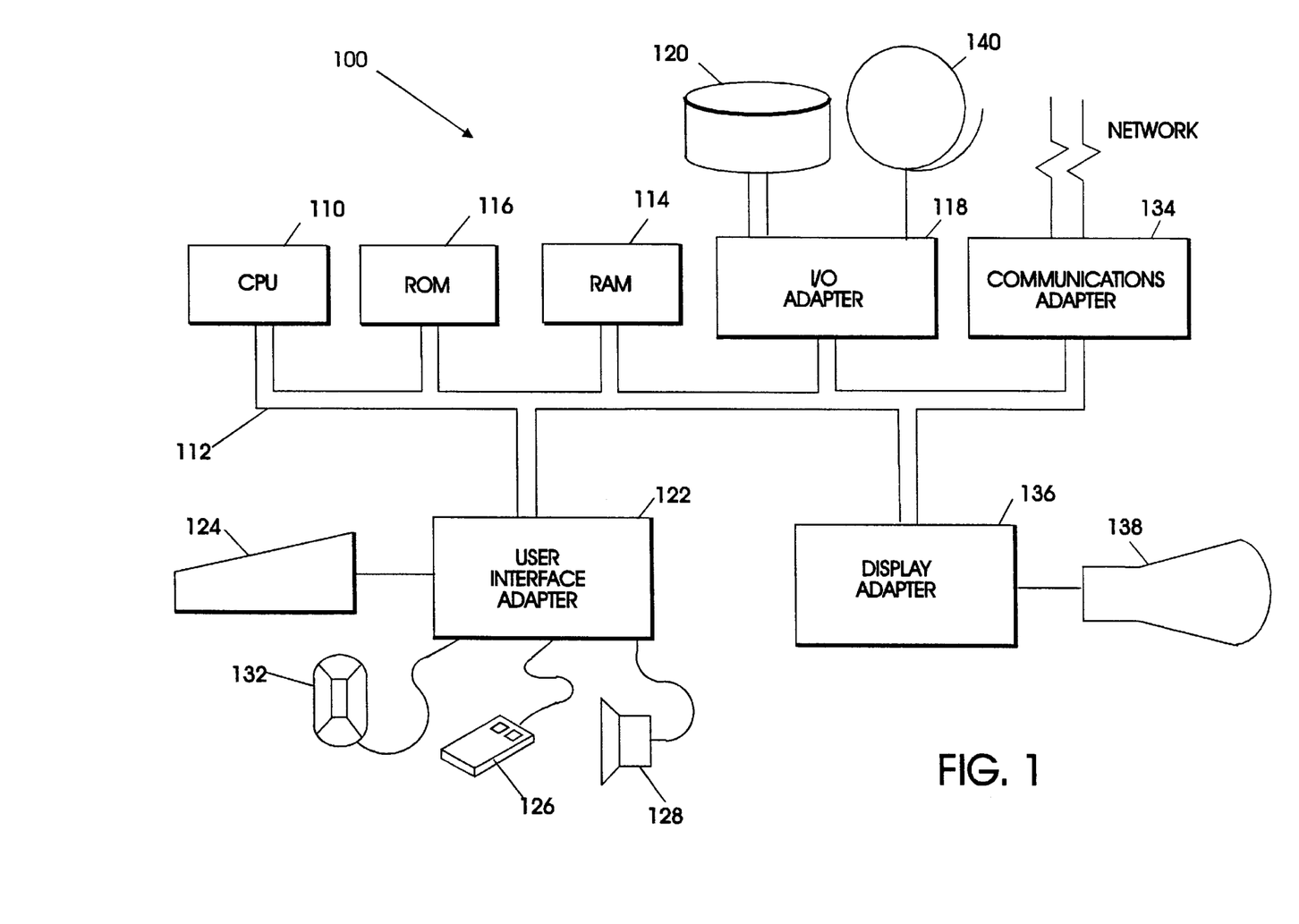
FIG. 1 illustrates, in block diagram form, a data processing system in accordance with one embodiment of the present invention.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory such as in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
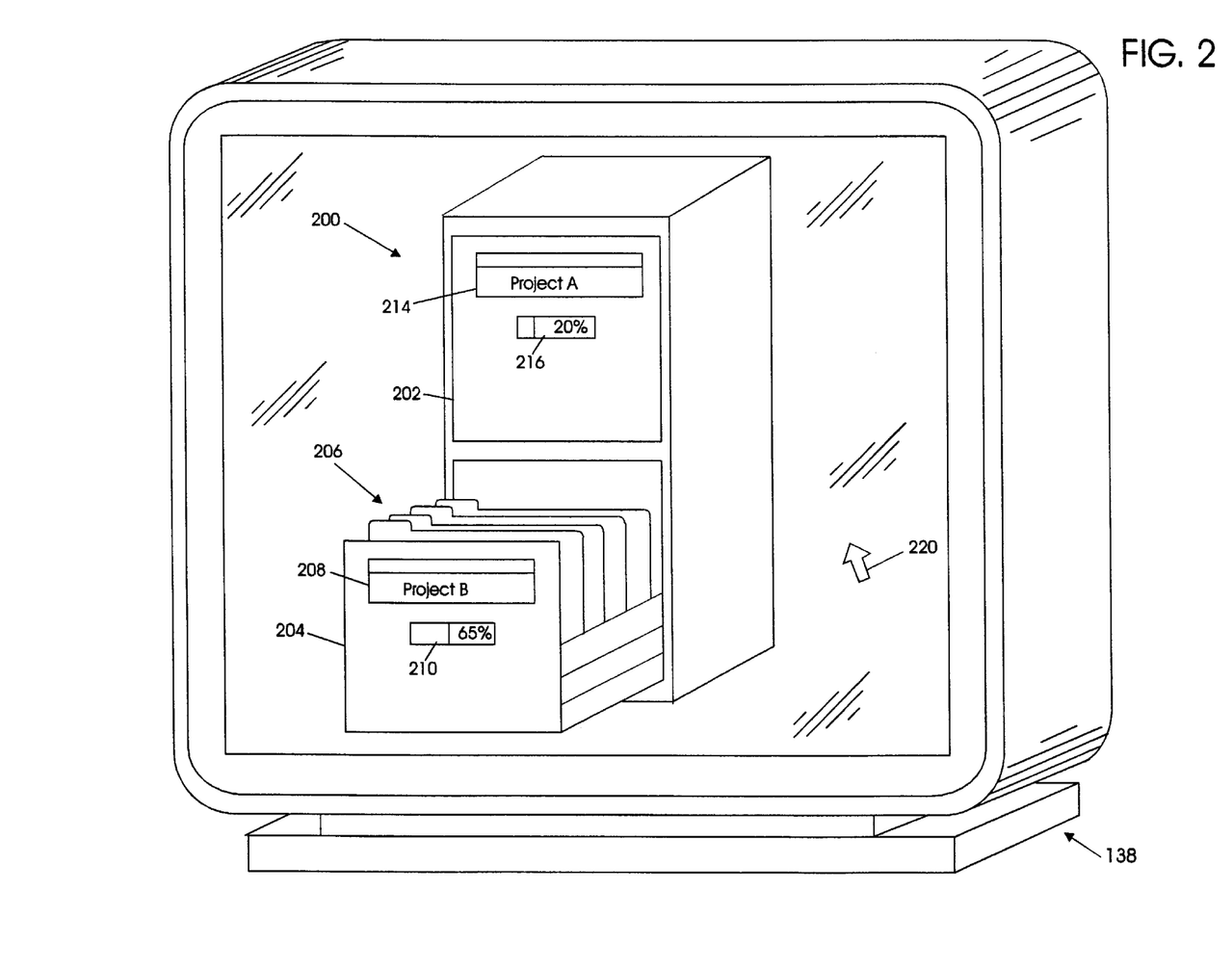
FIG. 2 illustrates, in block diagram form, a display device in accordance with one embodiment of the present invention.

Referring to FIG. 2, display device 138 and an object illustrated thereon are provided. It should be noted that the objects illustrated on display device 138 are determined by a remaining portion of data processing system 100. For example, CPU 110 controls the data communicated between display adapter 136 and both ROM 116 and RAM 114 to determine when an object is to be displayed on display device 138. In display device 138 of the present invention, a filing system window which illustrates a filing cabinet 200 as a real-world metaphor of storage space in data processing system 100, is provided. Filing cabinet 200 comprises two drawers 202 and 204. In one embodiment of the present invention, each of drawers 202 and 204 may be used to represent a disk drive, a server, a database, a partition, or an equivalent of a directory or any portion of a storage space designated by a user. In the example illustrated herein, drawer 202 comprises a label 214 for indicating the storage space represented by drawer 202. Additionally, drawer 202 comprises a label 216 for indicating an amount of the storage space which is available for use in the portion of the storage space represented by drawer 202. It should be noted that label 214 and label 216 may be used to indicate information desired by a user and are not limited to the functions described above. For example, a user may select a label which indicates a date range for objects stored therein or a label which indicates a content type of the objects, whether audio, text, video, or another application, stored in drawer 202. Additionally, label 216 is not required to indicate an amount of memory space available and label 216 may be used to indicate a wide variety of characteristics of drawer 202 and the storage space represented thereby.

It should be noted that in the embodiment of the invention illustrated in FIG. 2, drawer 202 is in a closed position, while drawer 204 is in an open position. As with drawer 202, drawer 204 also includes a label 208 for indicating a portion of the storage space with which drawer 204 is associated and a label 210 for indicating an amount of storage space available for use. It should be noted that label 208 and label 210 may be used to indicate information desired by a user and is not limited to the functions described above. For example, a user may select a label which indicates a date range for objects stored therein or a label which indicates a content type of the objects, whether audio, text, video, or another application, stored in drawer 204. Additionally, label 210 is not required to indicate an amount of memory space available and may be used to indicate a wide variety of characteristics of drawer 204 and the storage space represented thereby. Furthermore, as drawer 204 is in an open position, a plurality of folders 206 is illustrated therein. Each of the plurality of folders 206 represents either directories or files stored in the storage space associated with drawer 204.

The configuration of filing cabinet 200 and each of drawers 202 and 204 in FIG. 2 illustrates the utility and intuitive nature provided by the configuration of the present invention. For example, disk drives, servers, databases, partitions, a disk drive, and selected portions of a storage space which are the effective equivalent of a directory may be designated as a drawer in filing cabinet 200. The labels provided for each of the drawers which indicate a project or topic allows a user to easily access desired documents and data, while having information about the storage space in which they are contained and the contents of that storage space. As an example, in one embodiment of the present invention a visual indicator of an amount of space available in a storage space may be implemented to allow a user to accurately determine an amount of space available in each storage space portion so that their desired actions may be performed accordingly. For example, if label 216 of drawer 202 indicates that drawer 202 (and the storage space associated with it) is 99% full, an external user knows that some files or directories should be deleted before any additional files can be stored in the storage space associated with drawer 202. By using such an external label to provide storage space availability information, a user is not forced to either select a "drive space manager" which is several levels deep in a graphical user interface, or access a command line, type "dir," and wait for the contents to scroll by before being able to determine an amount of available storage space.

The use of such labels to provide visual indicators of an amount of available storage space is but one example of the kind of information which the labels implemented by the present invention may display. As previously mentioned, such labels may also indicates a date in which the storage space was last accessed, a date range of the contents of the storage space, or a list of types of objects stored within the storage space. It should be understood that the aforementioned possibilities are provided by way of example only and are not intended to limit the use to which the labels may be put. Indeed, any useful information may be placed on a face of a drawer filing cabinet object 200 of the present invention to allow a user to easily access information about documents and data stored within a storage space as well as information about the storage space itself. Operation of the data processing system of the present invention will subsequently be described in greater detail.

Figure 3A:
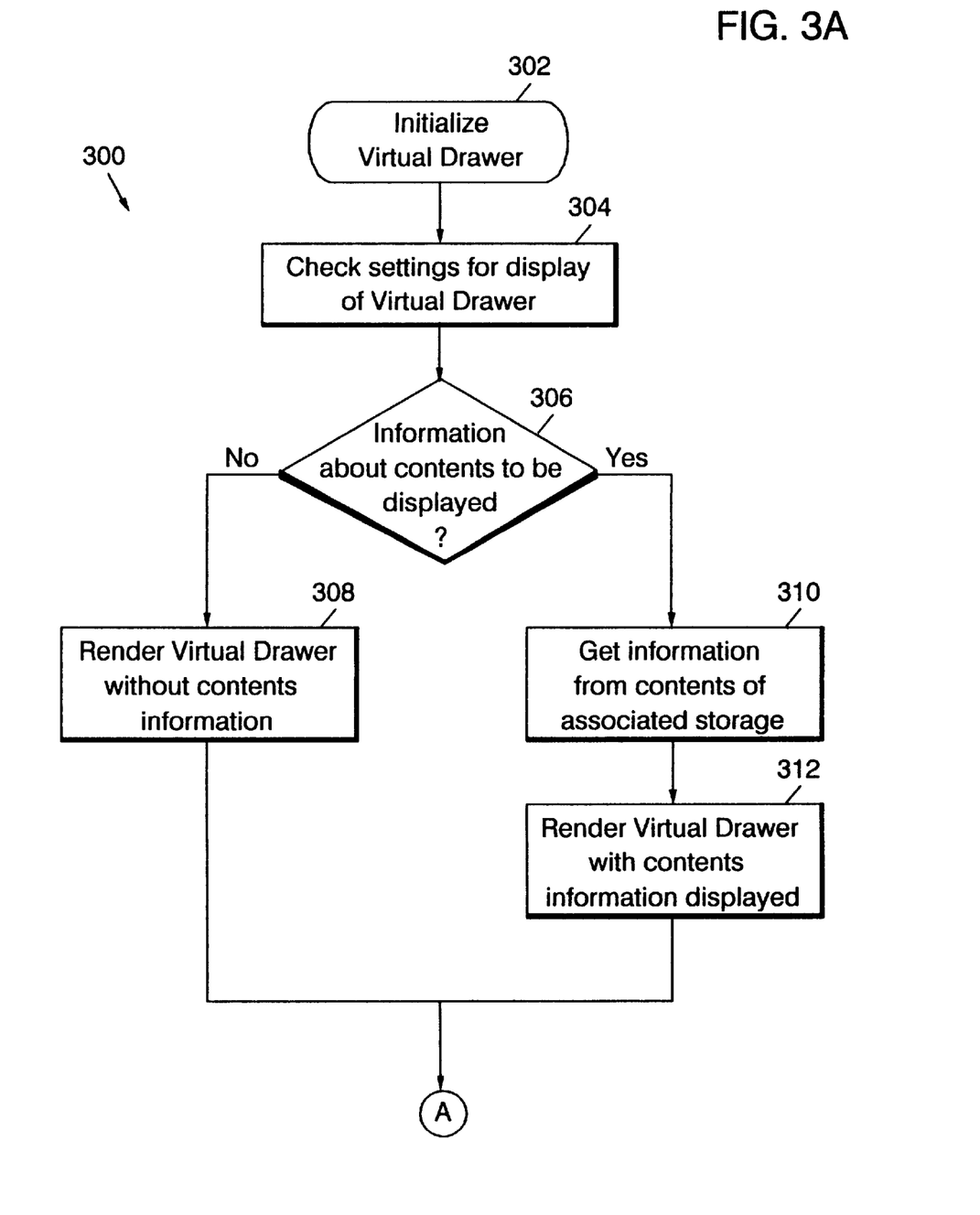

FIG. 3-A illustrates a flow chart which is implemented by the data processing system software of the present invention. To implement the methodology of the present invention described herein, CPU 110 executes the following steps to configure a filing system as a filing cabinet 200 and to subsequently display filing cabinet 200 on display device 138. In step 302, control signals indicating that a virtual drawer or a similar storage object is to be rendered on display device 138 are provided to CPU 110. Such control signals may be provided by the data processing system software of the present invention. Subsequently, in response to control signals provided by CPU 110, CPU 110 accesses "Settings" information associated with the virtual drawer. The "settings" were previously configured by an external user through the use of a graphical user interface which allowed the user to determine the information which she desired to be displayed about the storage space represented by the virtual drawer.

Next, in a step 306, CPU 110 determines whether information about the contents of the storage space represented by the virtual drawer should be displayed. If not, CPU 110 provides control signals to render the virtual drawer object on display device 138 in a step 308. In response to these control signals, data representing the virtual drawer is provided to display adapter 136 and display adapter 136 transforms the data to enable display device 138 to display the virtual drawer. The ability to take such control signals and display a graphical user interface in response thereto is well-known in the data processing art and will not be described in further detail herein. Alternatively, if CPU 110 determines that information about the contents should be displayed in response to the accessed settings, CPU 110 accesses the contents of the storage space associated with the virtual drawer to be displayed to obtain information in a step 310. Such information is obtained using a query from software which implements the present invention. The gathering of such information is well-known to those with skill in the data processing art and will not be described in detail herein.

Subsequently, in a step 312, CPU 110 provides control signals which enable display device 138 to render the virtual drawer with displayed information in compliance with the information obtained in step 310. As previously discussed, such "settings" information specifies the types of information to be displayed on the virtual drawer. The types of information to be displayed may include space available in the storage space, date of last access in the storage space, date range of the contents therein, and types of objects stored therein. This list is not meant to be exhaustive, but is provided as a series of examples only.

After the virtual drawer has been displayed on display device 138, CPU 110 awaits control signals indicating another operation should be executed. In a step 314, CPU 110 determines whether received control signals indicate that the contents of the virtual drawer have been modified. If the contents of the virtual drawer are modified, a program flow returns to step 310 in a step 316 and the information displayed on the drawer of the filing cabinet is updated in accordance with the steps outlined herein. Thus, the present invention, through the steps of 314 and 316, implements a methodology for automatically updating the labels of the virtual drawer displayed on display device 138 when the information reflected on the labels is modified. Such modifications may be occasioned by the removal of a document or current access of the document, among other possible actions.

Figure 3B:
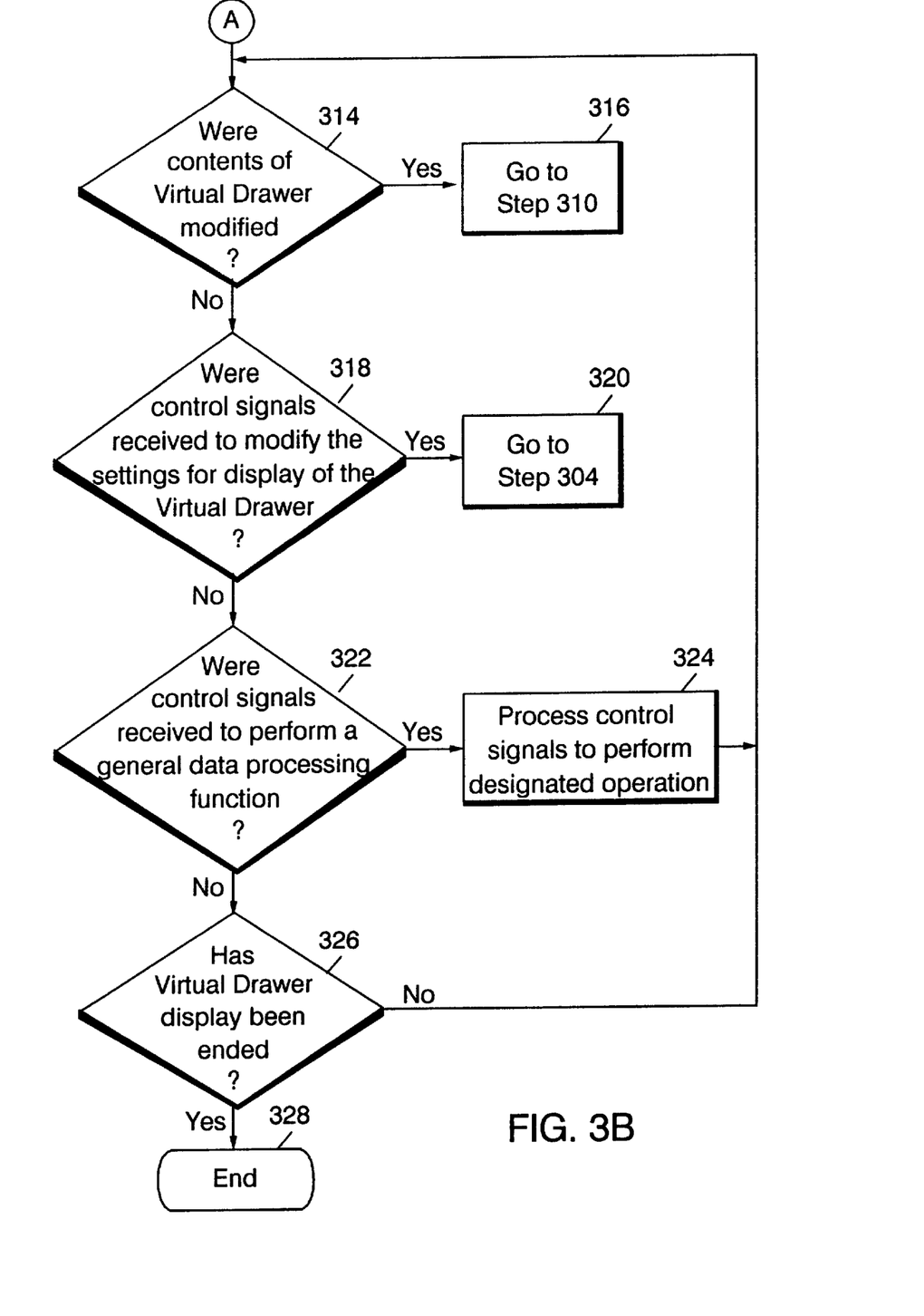

If the contents of the virtual drawer are not modified, CPU 110 next determines whether control signals were received to modify the settings for display of the virtual drawer in a step 318. As previously mentioned, the settings are configured in response to a user input. Such settings indicate a type of label and type of information which will be displayed on a face of the virtual drawer. If the control signals received by CPU 110 indicate that the settings for display of the virtual drawer should be modified, a program flow returns to step 304 in a step 320. Subsequently, the display of the virtual drawer on display device 138 is updated to reflect the modified setting.

If the control signals received by CPU 110 do not indicate that the settings for display of the virtual drawer should be modified, CPU 110 determines whether the control signals were received to perform a general data processing function in a step 322. Such general data processing functions include moving an object, copying an object, and editing an object's name, among others. When such control signals are received, CPU 110 and a remaining portion of data processing system 100 process the control signals to perform a designated operation in a step 324. Subsequently, a flow of the program of the present invention returns to step 314. If the control signals received by CPU 110 did not indicate that a general data processing function should be performed, CPU 110 next determines whether the virtual drawer display has been "ended" in a step 326. If yes, a program flow for rendering the virtual drawer of the present invention has ended and CPU 110 provides control information to display device 138 to close the filing cabinet metaphor displayed thereon. These steps are reflected in step 328. If the virtual drawer display has not been closed, a program flow returns to step 314.

Thus, the methodology of the present invention effectively and intuitively displays a storage space of a data processing system to an end-user. By providing information about the contents of this storage space and the storage space itself, a user is able to obtain desired information with a minimal number of steps. Furthermore, the ability of the present invention to update the information displayed on the virtual drawer or object representing the storage space insures that the displayed information is current and accurate. The ability of a user to modify the settings and to have such modifications immediately reflected on the object rendered on display device 138 allows a user great flexibility in obtaining a desired graphical user interface. An example utilizing the methodology of the present invention will be illustrated and described below.

Figure 4:
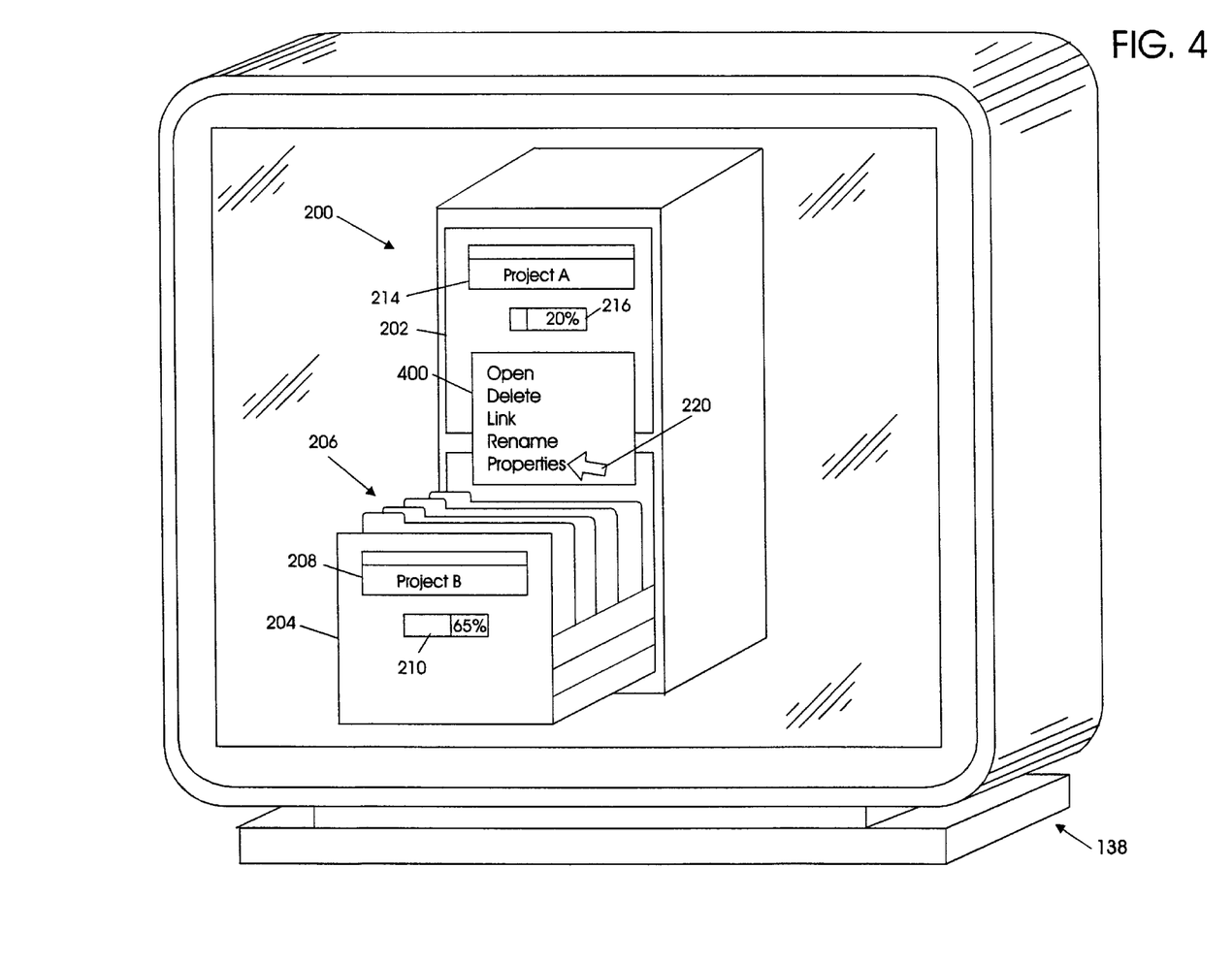
FIG. 4 illustrates, in block diagram form, a display device in accordance with one embodiment of the present invention.

For illustrative purposes, assume that a visual drawer has been initialized and the settings were initially implemented to have an available amount of storage space displayed thereon. This amount of storage space is provided as label 216 in FIG. 4. Subsequently, assume that a user determines that the display settings of virtual drawer 202 should be modified. As is illustrated in FIG. 4, by simply moving cursor 220 to a face of drawer 202, or any drawer included in filing cabinet 200, and clicking thereon, a menu of actions 400 appears. Menu 400 provides the open, delete, link, rename, and properties actions to be performed by a user on the container represented by drawer 202. Each of the actions appearing on menu 400 has been performed with icons and are, therefore, well-known in the relevant art. Thus, the present invention allows a user to retain the functionality associated with such icons in a more flexible environment. It should be noted that the same operation may be implemented using a different use control interface. For example, a keyboard key or spoken command may also be used to open menu 400. The methodology for implementing such user control interface is well-known in the data processing art and will not be described in detail herein.

Figure 5:
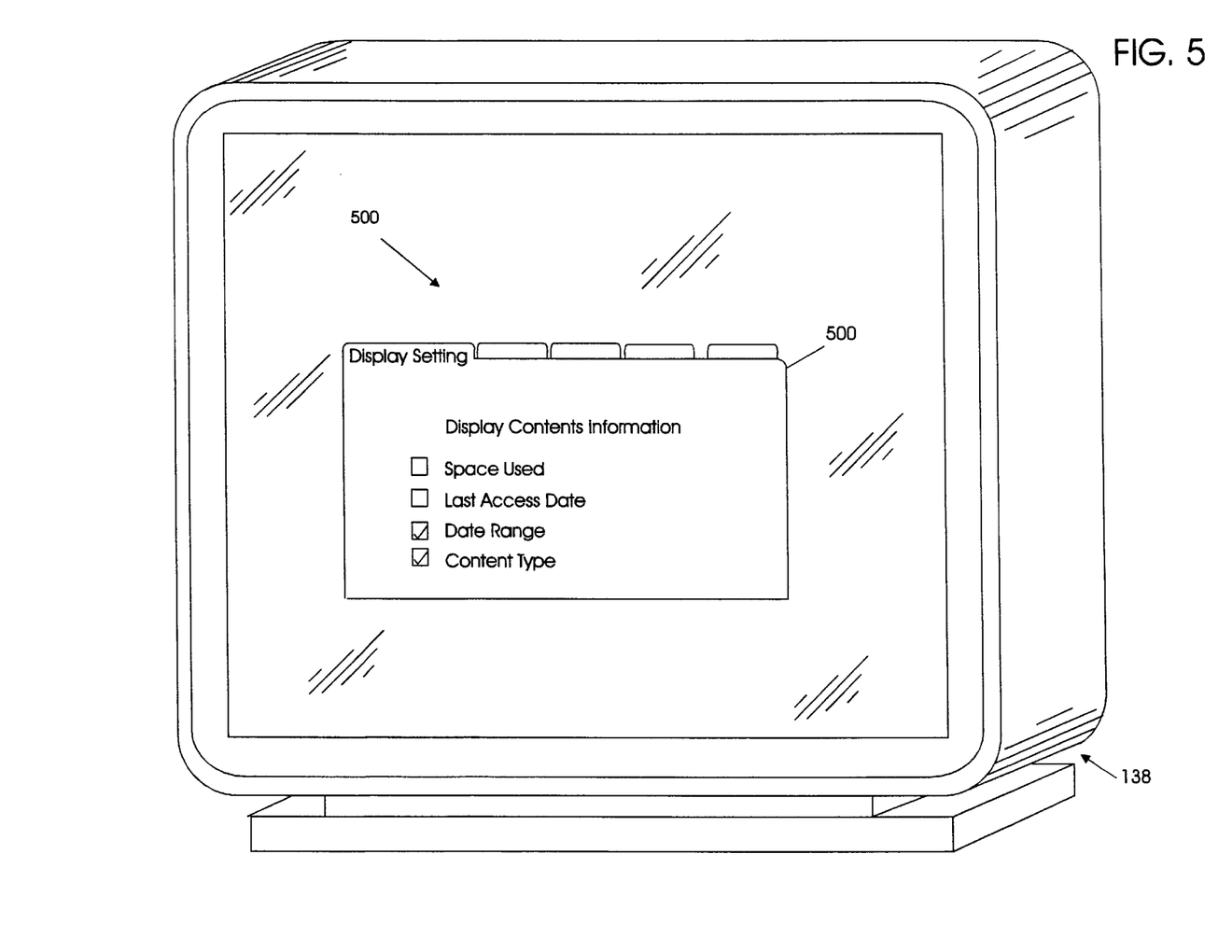
FIG. 5 illustrates, in block diagram form, a display device in accordance with one embodiment of the present invention.

After menu 400 has been opened, assume that a user utilizes cursor 220 to access a Properties notebook of data processing system 100. When the Properties action is accessed by cursor 220, a notebook, providing a Display Setting page, is opened on display device 138 of FIG. 5. The Display Setting page of the notebook provides choices for a user to select to determine a type of information to be displayed on virtual drawer 202. As is illustrated in FIG. 5, a user has selected to illustrate both a date range and a content type of the contents in virtual drawer 202. It should be known to those with skill in the relevant art that additional information may also be displayed on a face of virtual drawer 202 in a manner similar to that disclosed herein. Such additional information may include information naming an oldest file, a newest file, a last access date, a number of file, and a type of file stored therein, among other relevant information.

Figure 6:
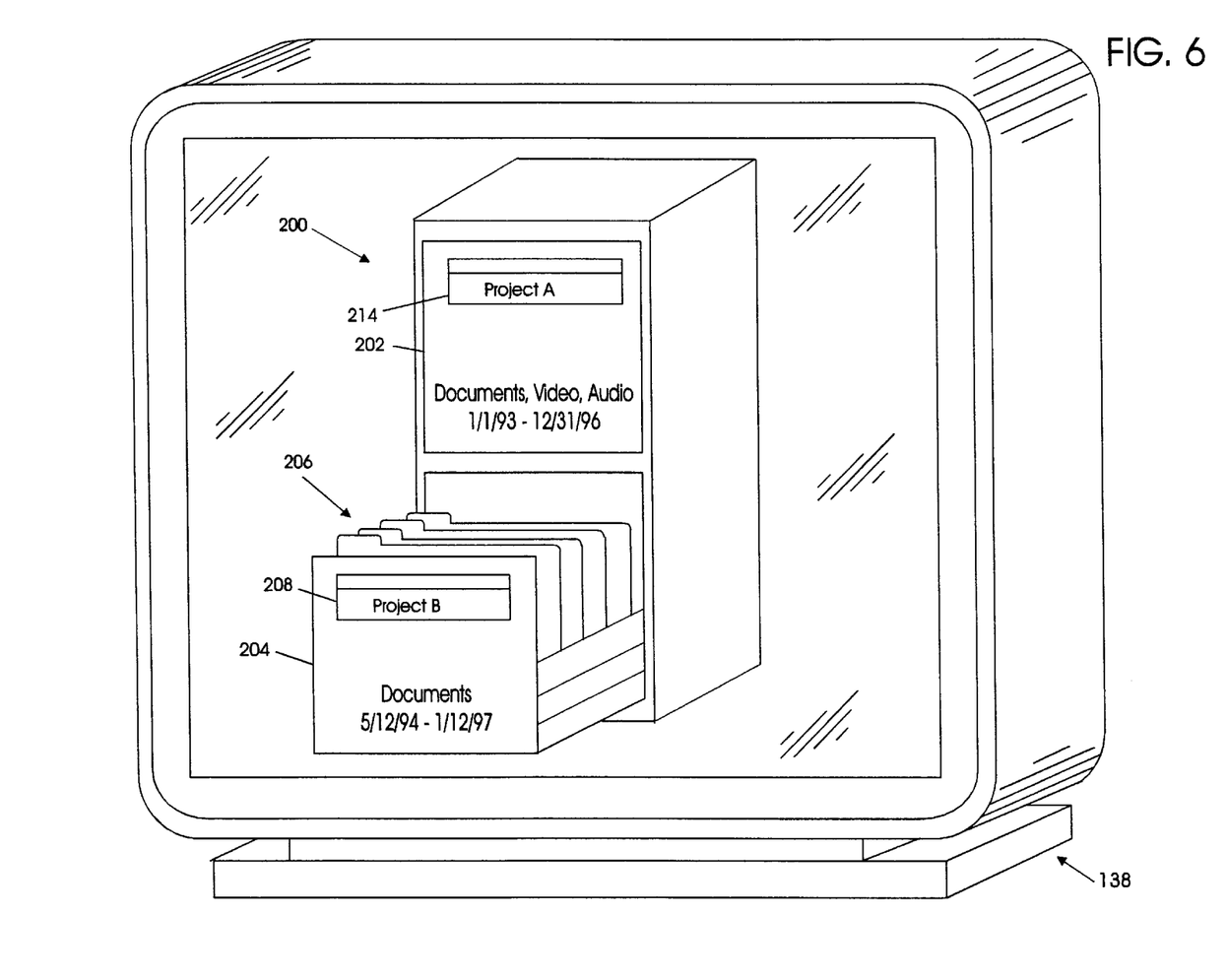
FIG. 6 illustrates, in block diagram form, a display device in accordance with one embodiment of the present invention.

Subsequently, after the user determines that the setting for display of virtual drawer 202 should be modified, the display of filing cabinet 200 on display device 138 is modified to appear as is illustrated in FIG. 6. It should also be noted that the steps required to render filing cabinet 200 on display device 138 of FIG. 6 correspond to steps 318, 320, and 304–312 of FIGS. 3-A and 3-B. Thus, after the display settings of FIG. 5 are modified, CPU 110 of data processing system 100 evaluates the settings in a step 304 to determine that information about the contents of the storage space identified by virtual drawer 202 should be displayed in the step 306. Subsequently, the desired information is accessed from the selected storage space in a step 310. As may be seen from the object rendered in FIG. 6, the selected storage space indicates that a date range of the objects stored therein is from Jan. 1, 1993 to Oct. 31, 1996. Furthermore, the information from the associated storage space indicates that its contents include Documents, Video, and Audio files. In a step 312, CPU 110 provides control signals to render virtual drawer 202 with the contents information displayed in accordance with the desired display settings. It should also be noted that similar steps occur for only virtual drawer 202 in response to the display setting provided above. Virtual drawer 204 would be configured and displayed in accordance with its own separate settings not illustrated herein.

Figure 7:
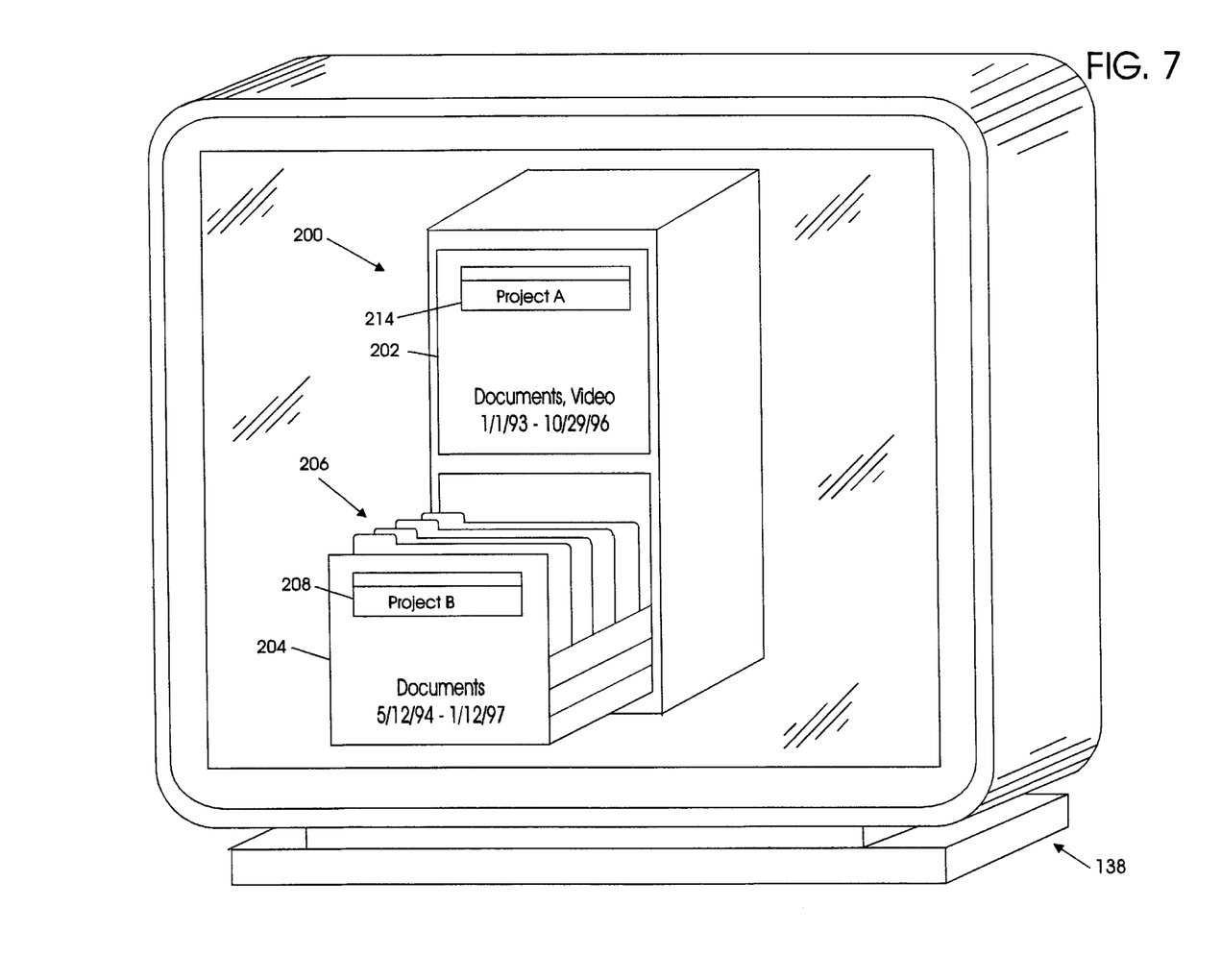
FIG. 7 illustrates, in block diagram form, a display device in accordance with one embodiment of the present invention.

Subsequently, assume that a user deletes all audio information from the storage space represented by virtual drawer 202. A step 314 of the flow chart described above is then executed and CPU 110 determines that the contents of the virtual drawer are modified. In this situation, information is obtained from the modified storage space in a step 310 of the flow chart of the present invention. In this case, the information indicates that there are no longer any audio contents in virtual drawer 202. Additionally, assuming that the last document or video object was placed in virtual drawer 202 on Oct. 24, 1996, a date range displayed on virtual drawer 202 is also modified. After the information is obtained from a modified storage space represented by virtual drawer 202, CPU 110 provides control signals to render virtual drawer 202 with modified contents information on display device 138. This modification is illustrated in FIG. 7.

By now it should be apparent that there has been provided a data processing system and methodology for implementing a file system which allows intuitive access by an external user. It should be noted that there are many additional configurations for implementing the invention described above. For example, the actions provided in menu 300 may be modified to have more or less actions and the display settings of the Properties menu may be modified to include more or less information.

Additionally, while there may have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:
    a display device for displaying a first object comprising a first information label, wherein the first object represents a selected portion of the data processing system;
    a user interface for receiving a first plurality of control signals corresponding to a first data processing operation, wherein the first plurality of control signals modifies the first data processing operation; and
    a central processing unit (CPU) coupled to the user interface to receive the first plurality of control signals, the CPU executing the first data processing operation, the first data processing operation accessing a second object and the CPU selectively providing a second plurality of control signals to modify the first information label in response thereto.

2. The data processing system of claim 1 wherein the first characteristic is an internal characteristic of the selected portion of the data processing system.

3. The data processing system of claim 1 wherein the first data processing operation is unrelated to the first information label.

4. The data processing system of claim 1 wherein the first object represents a storage space of the data processing system.

5. The data processing system of claim 4 wherein the first information label indicates an amount of available storage space in the data processing system.

6. The data processing system of claim 4 wherein the first information label indicates a date the storage space of the data processing system was last modified.

7. The data processing system of claim 4 wherein the first information label indicates a range of dates on which a plurality of contents of the storage space was created.

8. The data processing system of claim 4 wherein the first information label indicates a content type of a plurality of contents of the storage space.

9. The data processing system of claim 1 wherein the first object is displayed as a filing cabinet, comprising an at least one drawer.

10. The data processing system of claim 9 wherein the filing cabinet represents a storage space of the data processing system and the at least one drawer represents a subset of the storage space of the data processing system.

11. The data processing system of claim 10 wherein the first information label provides information about one of the subset of the storage space and a plurality of contents of the subset of storage space.

12. The data processing system of claim 1 wherein the central processing unit selectively enables the display device to display a menu to an external user.

13. The data processing system of claim 12 wherein the menu displays a plurality of information selections to be displayed by the first information label.

14. The data processing system of claim 12 wherein the menu displays a plurality of operations to be performed by the selected portion of the data processing system.

15. The data processing system of claim 1 wherein the first object further comprises a second information label for providing a name of the selected portion of the data processing system.

16. A method for displaying a container in a data processing system, comprising the steps of:
    accessing a first information value from a memory of the data processing system to indicate a first displayed characteristic;
    accessing a selected portion of the data processing system corresponding to the container to obtain a second information value corresponding to the first displayed characteristic; and
    displaying the second information value in a first information label of the container on a display device of the data processing system.

17. The method of claim 16 wherein the selected portion of the data processing system is a storage space of the data processing system.

18. The method of claim 17 wherein the first information value is one of an amount of available storage space, a date the storage space was last modified, a range of dates on which a plurality of contents of the storage space was created, and a content type of the plurality of contents of the storage space.

19. The method of claim 16, further comprising the step of:
    providing a user interface for enabling an external user to selectively indicate the first information value.

20. The method of claim 16 wherein the first information label provides information about one of the selected portion of the data processing system and a plurality of contents of the selected portion of the data processing system.

21. The method of claim 16, further comprising the steps of:
    receiving a plurality of control signals to modify a portion of contents of the selected portion of the data processing system;
    enabling a central processing unit of the data processing system to modify the portion of the contents of the selected portion of the data processing system;

accessing the selected portion of the data processing system corresponding to the logical container to obtain a third information value corresponding to the first displayed characteristic, wherein the third information value is accessed after the central processing unit modifies the portion of the contents of the selected portion of the data processing system; and displaying the third information value in the first information label of the container on the display device of the data processing system.

22. The method of claim 16, further comprising the steps of:

receiving a plurality of control signals access a third information value from the memory of the data processing system to indicate a second displayed characteristic;

accessing the selected portion of the data processing system corresponding to the container to obtain a fourth information value corresponding to the second displayed characteristic; and displaying the fourth information value in the first information label of the container on the display device of the data processing system.

23. A program storage device readable by a machine, tangibly embodying a program of instructions executable by the machine to perform method steps for simulating an object in a data processing system, said method steps comprising:

accessing a first information value from a memory of the data processing system to indicate a first displayed characteristic;

accessing a selected portion of the data processing system corresponding to the container to obtain a second information value corresponding to the first displayed characteristic; and displaying the second information value in a first information label of the container on a display device of the data processing system.

24. The program storage device of claim 23 wherein the selected portion of the data processing system is a storage space of the data processing system.

25. The program storage device of claim 24 wherein the first information value is one of an amount of available storage space, a date the storage space was last modified, a range of dates on which a plurality of contents of the storage space was created, and a content type of the plurality of contents of the storage space.

26. The program storage device of claim 23, further comprising the step of:

providing a user interface for enabling an external user to selectively indicate the first information value.

27. The program storage device of claim 23 wherein the first information label provides information about one of the selected portion of the data processing system and a plurality of contents of the selected portion of the data processing system.

28. The program storage device of claim 23, further comprising the steps of:

detecting when a plurality of control signals modify a portion of contents of the selected portion of the data processing system;

accessing the selected portion of the data processing system corresponding to the container to obtain a third information value corresponding to the first displayed characteristic, wherein the third information value is accessed after the central processing unit modifies the portion of the contents of the selected portion of the data processing system; and displaying the third information value in the first information label of the container on the display device of the data processing system.

29. The program storage device of claim 23, further comprising the steps of:

receiving a plurality of control signals access a third information value from the memory of the data processing system to indicate a second displayed characteristic;

accessing the selected portion of the data processing system corresponding to the container to obtain a fourth information value corresponding to the second displayed characteristic; and displaying the fourth information value in the first information label of the container on the display device of the data processing system.

* * * * *